United States Patent [19]
Ohi et al.

[11] Patent Number: 5,127,734
[45] Date of Patent: Jul. 7, 1992

[54] LASER INTERFEROMETER FOR INSPECTING THE SURFACE OF A SPECIMEN

[75] Inventors: Shigenori Ohi; Yukio Kondou; Kenichi Noguchi; Shigeo Mizukawa; Hiroshi Shibamoto; Masane Suzuki, all of Omiya, Japan

[73] Assignee: Fuji Photo Optical Co., Ltd., Omiya, Japan

[21] Appl. No.: 642,451

[22] Filed: Jan. 17, 1991

[30] Foreign Application Priority Data

Jan. 24, 1990 [JP] Japan ............... 2-4608[U]
Jan. 25, 1990 [JP] Japan ............... 2-5869[U]

[51] Int. Cl.$^5$ .............................. G01B 9/02
[52] U.S. Cl. .................... 356/359; 356/345; 372/65
[58] Field of Search .............. 356/358, 359, 345; 372/65, 107

[56] References Cited

U.S. PATENT DOCUMENTS

4,377,036  3/1983  Dongschat ............ 356/358
4,654,856  3/1987  Markley et al. ........ 372/107

Primary Examiner—Samuel A. Turner
Assistant Examiner—Richard E. Kurtz, II
Attorney, Agent, or Firm—Oblon, Spivak, McClelland, Maier & Neustadt

[57] ABSTRACT

A laser interferometer for inspecting the surface condition of a specimen by irradiating the specimen on a specimen support mechanism with a laser beam projected thereto through a reference plate, and observing the interference fringe produced by interference between reflected light from a reference surface of the reference plate and a surface of the specimen under inspection, the laser interferometer includes: an interferometer housing accommodating therein an optical laser beam guide member and an optical interference fringe imaging member, and is provided with a laser beam guide portion in a wall portion thereof; a laser tube mount member of a cylindrical form projected on the outer side of the housing and positioned in such a manner so as to circumvent the laser guide portion; and a laser tube detachably fitted in the laser tube mount member.

11 Claims, 8 Drawing Sheets

LASER INTERFEROMETER FOR INSPECTING THE SURFACE OF A SPECIMEN

BACKGROUND OF THE INVENTION

1. Field of the Invention

This invention relates to an interferometer using a laser beam, and more particularly to an interferometer which is arranged to facilitate laser tube replacements.

2. Description of the Prior Art

Laser interferometers have been used for inspecting and measuring infinitesimally fine surface conditions such as flatness or sphericity of an object, and are generally arranged to measure the surface condition of an object or specimen under inspection by irradiating the object or specimen with a laser beam which is projected from a laser tube through a reference plate, producing an interference fringe by the interference between the reflected light from the object and the reflected light from the reference plate, and taking the image of the interference fringe by an interference fringe imaging means. The laser tube of this sort is usually accommodated in a housing along with an interference fringe image sensor means, an optical laser beam guide means, and an optical interference fringe imaging means. This housing is maintained in a shielded state to protect the housed components against dust.

The output power of the laser tube drops after operation over a certain period of time, so that it has to be replaced at a suitable point in time. The replacement of the laser tube requires not only mounting a fresh laser tube in place of the old one but also adjusting its optical axis relative to the optical laser beam guide means. This job is troublesome and takes a great deal of time. Besides, since the housing has to be held in an opened state while replacing the laser tube, there are possibilities of dust or foreign matter entering the housing and being deposited on optical members of the laser guide means, interference fringe imaging means or on other built-in components.

Further, the laser tube which is relatively elongated in shape gives rise to a problem in that the size of the housing has to be increased for accommodation a long laser tube. Besides, in order to support a housing of such a large size stably, it becomes necessary to mount the housing on at least four supporting posts, which, however, complicates the interferometer construction and impedes automation of the operations of loading and unloading specimens.

SUMMARY OF THE INVENTION

In view of the foregoing situations, the present invention has as its object the provision of an interferometer which has a laser tube located outside the housing to facilitate its replacement, while permitting a reduction in size of the housing.

In accordance wit the present invention, there is provided, for achieving the above-stated objective, a laser interferometer for inspecting the surface condition of a specimen positioned on a specimen support means by irradiating the same with a laser beam projected thereto through a reference number, and observing the interference fringe produced by interference between reflected light from a reference surface of the reference plate and a surface of the specimen under inspection, characterized in that the laser interferometer comprises a housing accommodating therein an optical laser beam guide means and an optical interference fringe imaging means, and provided with a laser beam guide portion in a wall portion thereof; a laser tube mount member of a cylindrical form projected on the outer side of the housing and positioned in such a manner as to circumvent the laser guide portion; and a laser tube detachably fitted in the laser tube mount member.

BRIEF DESCRIPTION OF THE DRAWINGS

The above and other objects, features and advantages of the invention will become apparent from the following description and the appended claims, taken in conjunction with the accompanying drawings in which:

FIGS. 1 through 4 illustrate a first embodiment of the invention, of which

FIGS. 6 to 10 illustrate a second embodiment of the invention, of which

DESCRIPTION OF THE PREFERRED EMBODIMENTS

Hereinafter, the invention is described in detail by way of the preferred embodiments shown in the drawings.

Figure 1:
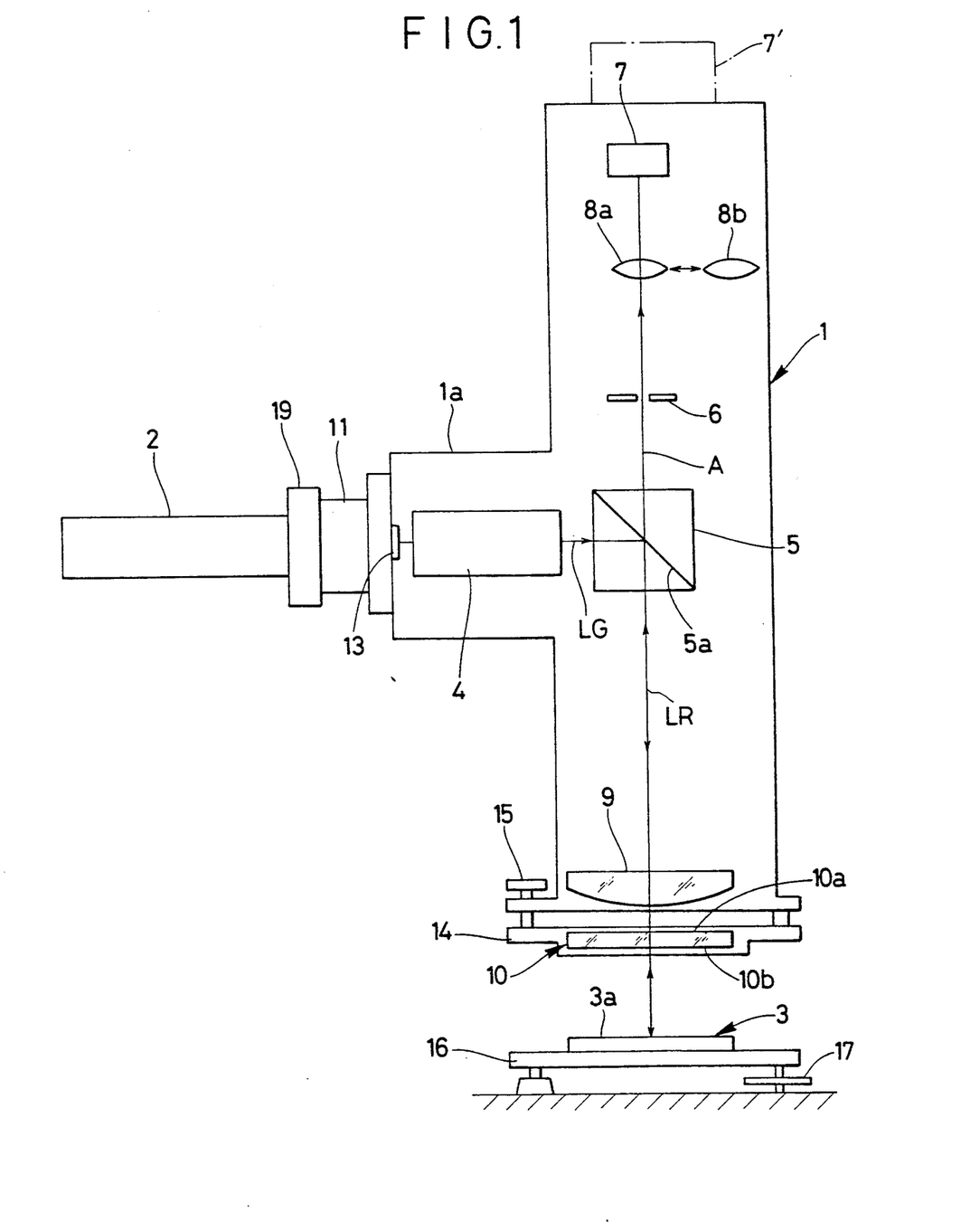
FIG. 1 is a schematic view of a laser interferometer.

Referring first to FIG. 1, there is schematically shown the general construction of a laser interferometer according to the invention, in which indicated at 1 is a housing, at 2 is a laser tube, and at 3 is a specimen. The housing 1 internally provides a shielded space to prevent intrusion of dust or foreign substances from outside, and accommodates therein an optical lens unit 4 having such an expander, diverger or the like, a beam splitter 5, a screen 6, and an image sensor means 7. The image sensor means 7 may be located outside of the housing 1 as indicated by an imaginary line in FIG. 1, if desired. Provided between the screen 6 and the image sensor means 7 are a light-spot imaging lens 8a and an interference fringe imaging lens 8b which are selectively switchable into a position in line with the light path. Further, a collimater lens 9 is located in a lower portion of the housing 1 in a position over a reference plate 10 which faces a specimen 3.

As regards the positional relations of the components installed in the housing 1, the image sensor means 7, light-spot imaging lens 8a (or interference fringe imaging lens 8b), screen 6, beam splitter 5, collimator lens 9 and reference plate 10 are successively located from the top to bottom side of the housing 1 accurately in alignment with each other. The optical lens unit 4 is mounted in a lateral extension 1a of the housing 1, and positioned exactly at an angle of 45° with a light reflecting surface 5a of the beam splitter 5. The optical lens unit 4 transmits a laser beam emitted from the laser tube 2 toward the beam splitter 5 with the light beam mode of divergence.

Figure 2:
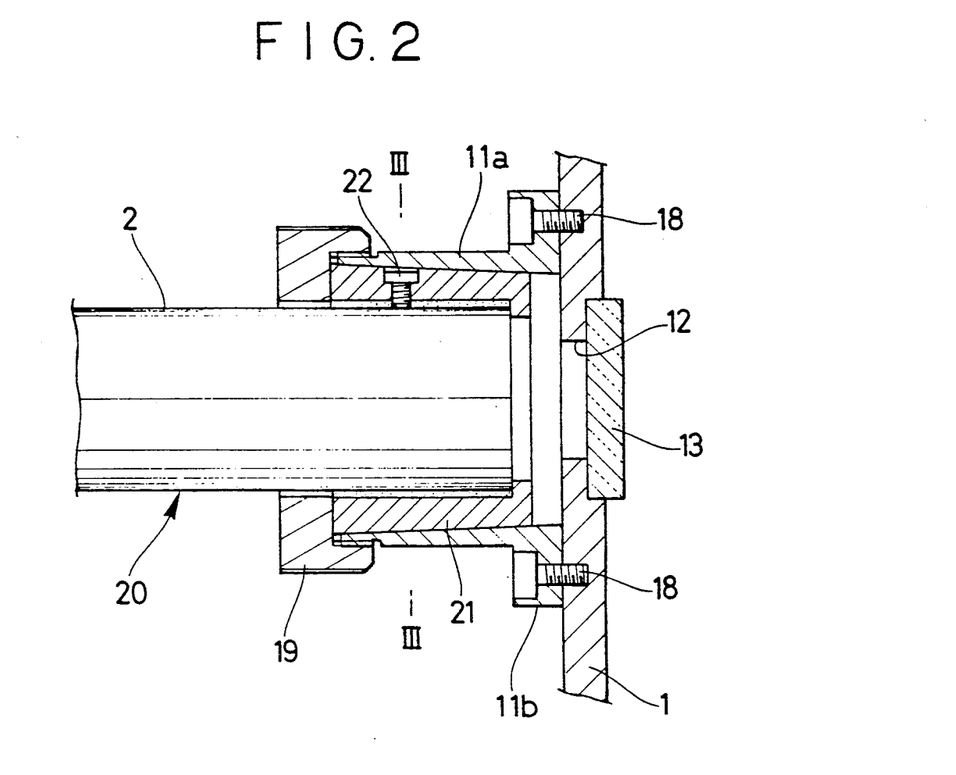
FIG. 2 is a sectional view of a laser tube mounting structure on a housing.

The laser tube 2 is detachably mounted on a laser tube mount portion 11 which is provided on the lateral extension 1a of the housing 1. The laser tube mount portion 11 is constituted by a cylindrical member as will be described hereinafter the cylindrical member being projected on the outer side of the housing 1 from a position which circumvents a light guide portion 12 formed in the lateral extension 1a of the housing 1 (FIG. 2). The light guide portion 12 has an optical filter 13 fitted therein.

Accordingly, the laser beam LG which is emitted from the laser tube 2 is led into the housing 1 through the optical filter 13 fitted in the light guide portion 12 and is passed through the optical lens unit 4, then reflected on a reflecting surface 5a of the beam splitter 5, bending its light path at the angle of 90° toward the collimater lens 9 to irradiate the reference plate 10 with collimated light.

In this instance, the reference plate 10 is in the form of a sheet of optical glass or the like, which has a light incident surface 10a on the side facing the collimater lens 9, and a reference surface 10b on the opposite side, the light incident surface 10a and reference surface 10b being in non-parallel relation with each other. The light-incident surface 10a is provided with an antireflection coating, while the reference surface 10b is a surface with high precision flatness. Therefore, the light which is incident on the reference plate 10 is partly reflected on the reference surface 10b while the major part of the light is passed through the reference plate 10 to irradiate the specimen 3. As a result, an interference fringe is produced by interference between the light reflected from the reference surface 10b of the reference plate 10 and the light reflected from the inspecting surface 3a of the specimen 3.

The reflected light LR with the thus formed interference fringe is transmitted successively through the collimater lens 9, beam splitter 5, screen 6 and interference fringe imaging lens 8b into the image sensor means 7 thereby to take the image of the interference fringe.

In order to measure the surface condition of the specimen 3 accurately, the reference plate 10 and specimen 3 need to be held in alignment with the optical axis A. For this purpose, the reference plate 10 is fitted in a holder 14, which is attached to the lower end of the housing 1 through a couple of adjusting screws 15 and a fulcrum member such that its angle can be adjusted by turning the adjusting screws 15 to a suitable degree. On the other hand, the specimen 3 is placed on a specimen mount plate 16, the angle of which is also adjustable through adjusting screws 17. Consequently, the reference plate 10 and the specimen 3 can be adjusted exactly into alignment with the optical axis of the incident and reflect laser beam and in parallel relation with each other. The light-spot imaging lens 8a is provided for the purpose of determining whether or not the reference plate 10 and specimen 3 have been adjusted into a correct position.

Figure 3:
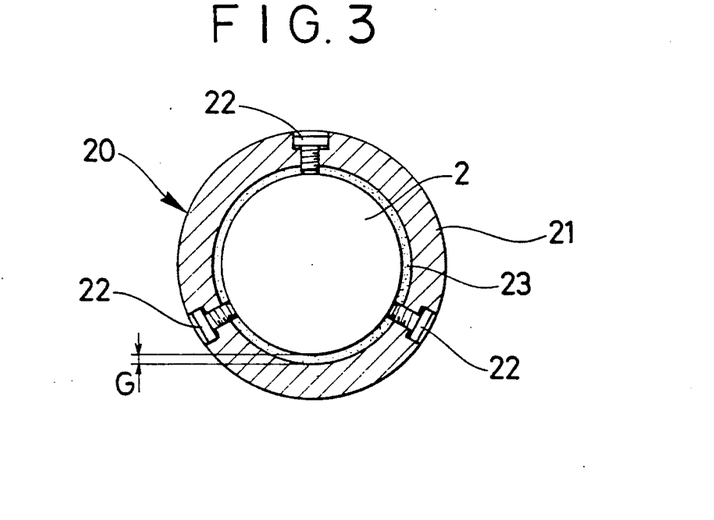
FIG. 3 is a sectional view of the laser tube unit, taken along line III—III of FIG. 2.

Referring to FIGS. 2 and 3, there is shown the construction of the laser tube mount 11 which releasably holds the laser tube 2. As is clear from these figures, the laser tube mount 11 is constituted by a cylindrical body 11a and a flange portion 11b which circumvent the light guide portion 12 in the lateral extension 1a of the housing 1. The flange portion 11b is securely fixed to the outer wall surface of the housing 1 by bolts 18. The inner periphery of the cylindrical body 11a of the laser tube mount 11 is tapered to have a gradually reduced diameter from its fore end toward its rear end on the side of the housing 1. Detachably fitted in the cylindrical body 11a is a laser tube 2 in the form of a laser tube unit 20 which has a pre-adjusted light path.

Generally, the laser tube 2 has a casing which is fabricated without high precision dimensional requirements, namely, with relatively large tolerances. Therefore, when the laser tube 2 is directly fitted in the laser tube mount 11, there often arises a problem of misalignment of its optical axis, deviated from that of the light path of the incident laser beam, that is to say, from the optical axis A of the light guiding lens unit 4 mainly due to the dimensional tolerance in outside diameter of the laser tube 2. It is therefore necessary to adjust the light path for compensation of the deviation in order to align the two optical axes correctly with each other. A ring member 21 is provided for the adjustment of the optical axis A, which ring member 21 is fixedly fitted on a fore end portion of the laser tube 2 to form a laser tube unit 20 to be fitted in the laser tube mount 11.

The ring member 21 has an inside diameter which is slightly larger than the outside diameter of the laser tube 2 to leave a gap G therebetween when they are in a coupled state. The ring member 21 is provided with adjusting screws 22 at three equidistant positions around its circumference with a phase difference of 120° from each other. The fore ends of these adjusting screws 22 are abutted against the outer surface of the laser tube 2 to hold the latter in position. Accordingly, the laser tube 2 can be inclined in a desired direction by threading in or out the three adjusting screws 22 to a suitable degree for adjustment of the optical axis A. In order to set the laser tube 2 in position relative to the ring member 21 after the adjustment of its angle, a filler member 23 such as an adhesive, sealing agent or the like is filled in the gap G between the outer surface of the laser tube 2 and the inner periphery of the ring member 21.

On the other hand, the outer periphery of the ring member 21 is tapered correspondingly to the tapered inner periphery of the cylindrical body 11a of the laser tube mount 11. Accordingly, upon threading a box nut 19 onto the laser tube mount 11 in which the ring member 21 with the laser tube 2 has been inserted, the inner end face of the ring member 21 is driven inward, bringing the outer surface of the ring member 21, which is connected to the laser tube 2, into intimate contact with the inner periphery of the laser tube mount 11 to fix the laser tube 2 in position in the laser tube mount 11.

As described above, the laser tube 2 is fitted in the laser tube mount 11 as a laser tube unit 20 having the ring member 21 connected to the laser tube 2. The optical axis of the laser tube 2, to be fitted as a laser tube unit 20 in the laser tube mount 11, is preadjusted to align correctly with the optical axis of the optical lens unit 4 by the use of the adjusting mechanism shown in FIG. 4.

Figure 4:
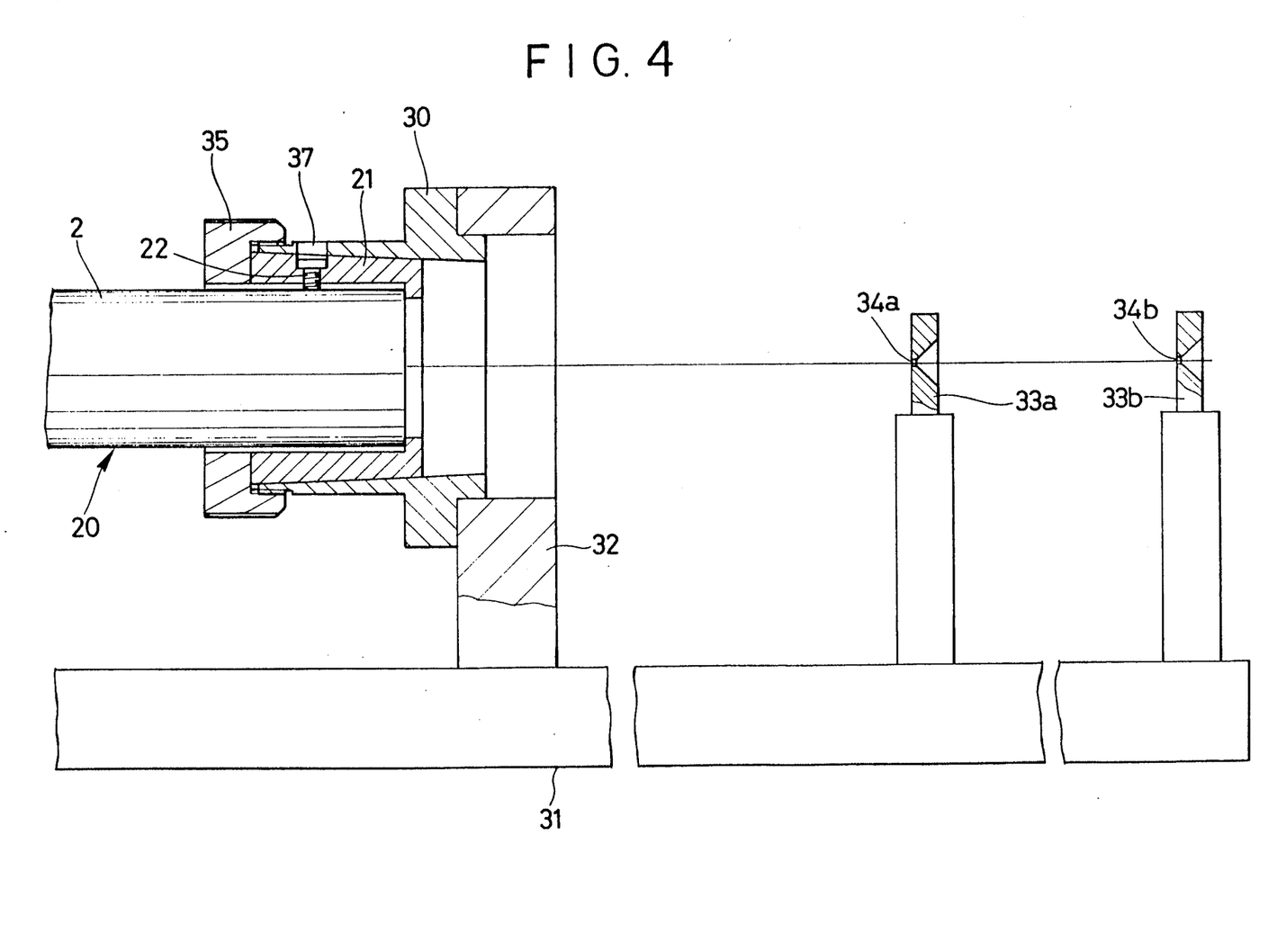
FIG. 4 is a schematic view of a mechanism for aligning the optical axis of the laser tube.

In FIG. 4, indicated at 30 is a ring holder with an inner periphery of a shape exactly corresponding to that of the inner periphery of the laser tube mount 11. The ring holder 30 is fixedly mounted on a base plate 31 through a bracket 32. Provided in the base plate 31 are a first target member 33a which is located at a position corresponding to the light guide portion 12 of the housing 1 and coinciding with the position of the optical lens unit 4, and a second target member 33b which is located at a position sufficiently spaced from the first target member 33a. Bored in these target members 33a and 33b are pin holes 34a and 34b, respectively, each in a position in alignment with the light guiding lens unit 4 within the housing 1. A box nut 35 similar to the aforementioned box nut 19 is threaded on the ring holder 30.

In short, this optical axis aligning mechanism is an exact reproduction of a light guide path in laser interferometers, and yet, in consideration of the tolerance in the angle of incidence of the optical system, it is arranged to make high precision alignment of the optical axes, providing the second target member 33b in a position rearward of the first target member 33a. Accordingly, as long as a laser beam from the laser tube 2, which is fitted in the ring holder 30 together with the ring member 21, passes through the pin holes 34a and 34b of the target members 33a and 33b, the optical axis of the laser tube 2 is automatically aligned with the optical lens unit 4 when fitted in the laser tube mount portion 11.

In this instance, as mentioned hereinbefore, the casing of the laser tube 2 is usually fabricated with large tolerances or without high accuracy requirements, so that the angle of the laser tube 2 needs to be adjusted after coupling the ring member 21 with the ring holder 30. For this laser tube angle adjustment, the ring holder 30 is provided with apertures or through holes 37 in its cylindrical body, permitting to turn the adjusting screws 22 from outside.

Thus, after forming a laser tube unit 2 by fitting the laser tube 2 into the ring member 21 and temporarily fixing the laser tube 2 relative to the latter by means of the adjusting screws 22, the unit is fitted and fixed in the ring holder 30 by threading the box nut 35 thereon. In this state, while projecting a laser beam from the laser tube 2 toward the target members 33a and 33b, the three adjusting screws 22 are turned to suitable positions by means of a screwdriver or other jig which is inserted through the apertures 37. By so doing, the angle of the laser tube, namely, the direction of the laser beam can be varied for the adjustment of optical axis.

The optical axis is adjusted such that the laser beam from the laser tube 2 passes through the pin holes 34a and 34b of the target members 33a and 33b. In this adjusted state, the screws 22 are tightened, and the laser tube unit including the laser tube 2 and ring member 21 is extracted from the ring holder 30. A filler material 23 is then filled in the gap space between the laser tube 2 and ring member 21 to obtain a laser tube unit 20 which has the laser tube 2 integrally fixed with the ring member 21.

With the above-described arrangement, the laser tube 2 can be replaced in an extremely simplified and prompt manner. Namely, a laser tube unit 20 which is currently fitted in the laser tube mount 11 is extracted therefrom by loosening the box nut 19, and a fresh laser tube unit 20 is fitted in position in the laser tube mount 11, followed by tightening of the box nut 19. Besides, since the laser tube 2 is located outside the housing 1, the housing can be maintained in a sealed state at the time of the laser replacement by the optical filter 13 which is fitted in the light guide portion 12 of the housing 1, precluding the possibilities of dust or foreign matter being deposited on the optical system or other components within the housing 1. However, as the laser tube 2 can be replaced instantly, the optical filter 13 may be provided on part of the laser tube unit 20 instead of on the part of housing 1, if desired. In such a case, although the light guide portion 12 is opened at the time of replacement of the laser tube, the possibility of dust entering the housing 1 through the light guide portion 12 is considered to be extremely low in view of the shortened time period for replacement.

A fresh laser tube 2 which has been assembled with the ring member 21 beforehand by means of the optical axis adjusting mechanism can be automatically set in an aligned position upon fitting the same in the laser tube mount 11.

Further, the above-described arrangement in which the laser tube is located outside the housing 1 permits a reduction in size of the housing 1 so as to be in a compact form, coupled with a reduction in sectional area of the housing 1 by the employment of the vertical light path for the reflected light LR from the specimen 3 and reference plate 10 to the image sensor means 7. Accordingly, the housing 1 can be supported only at one side thereof for the purpose of simplifying the construction of the laser interferometer as a whole and facilitating the loading and unloading of the specimens 3.

Figure 5:
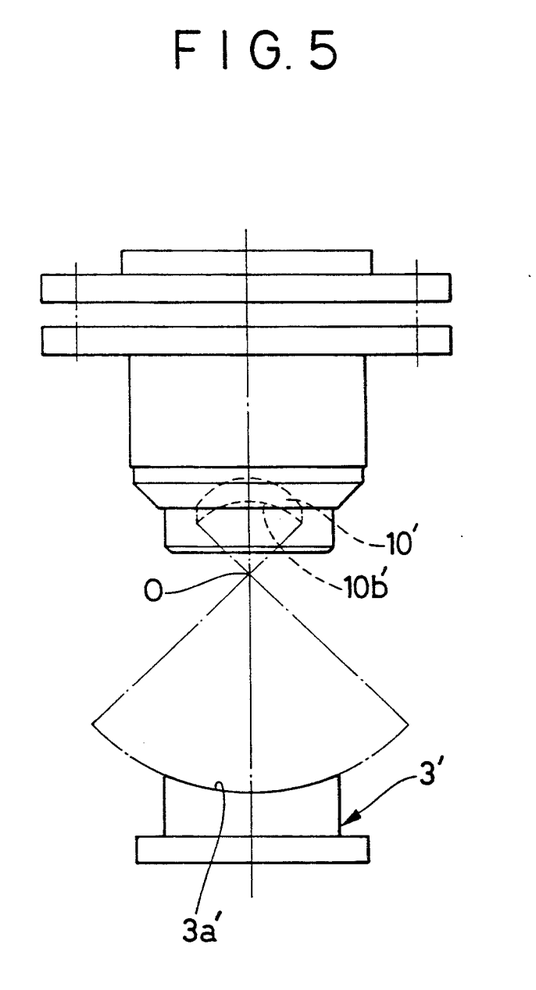
FIG. 5 is a schematic view of major components of a laser interferometer according to the invention, which is arranged to inspect sphericity of a specimen.

Although a specimen of a flat shape is shown in the foregoing embodiment, the laser interferometer can also be used for measuring the sphericity of a surface $3a'$ on a specimen $3'$ as shown in FIG. 5. In this case, the center of the radius of curvature of the inspecting surface $3a'$ is located so as to coincide with the center of curvature of a reference surface $10b'$ of a reference plate $10'$ on the optical axis of the laser beam, such that the optical axis bisects the arcs of the inspecting and reference surfaces $3a'$ and $10b'$ into equal segments.

Referring now to FIGS. 6 through 10, there is shown a second embodiment of the invention.

Figure 6:
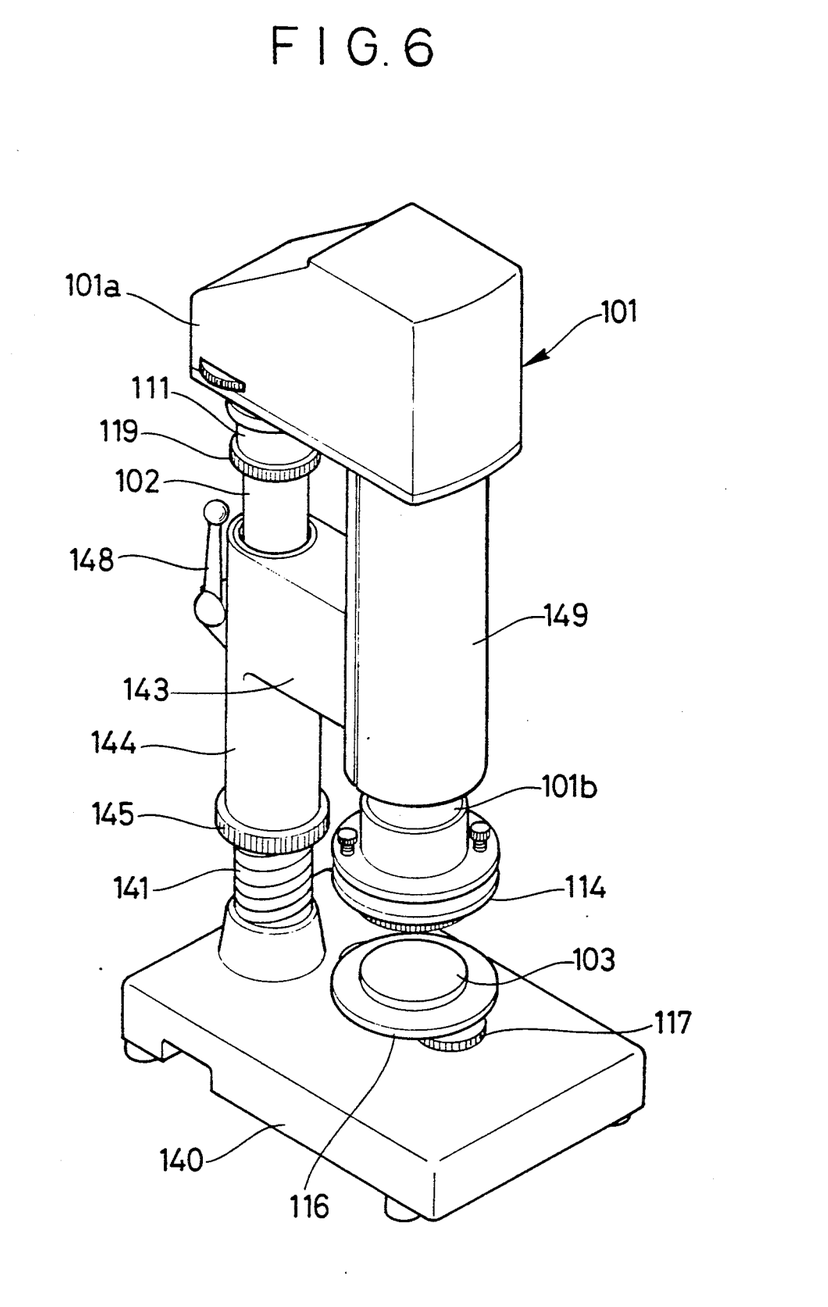
FIG. 6 is an outer view of a laser interferometer.
Figure 7:
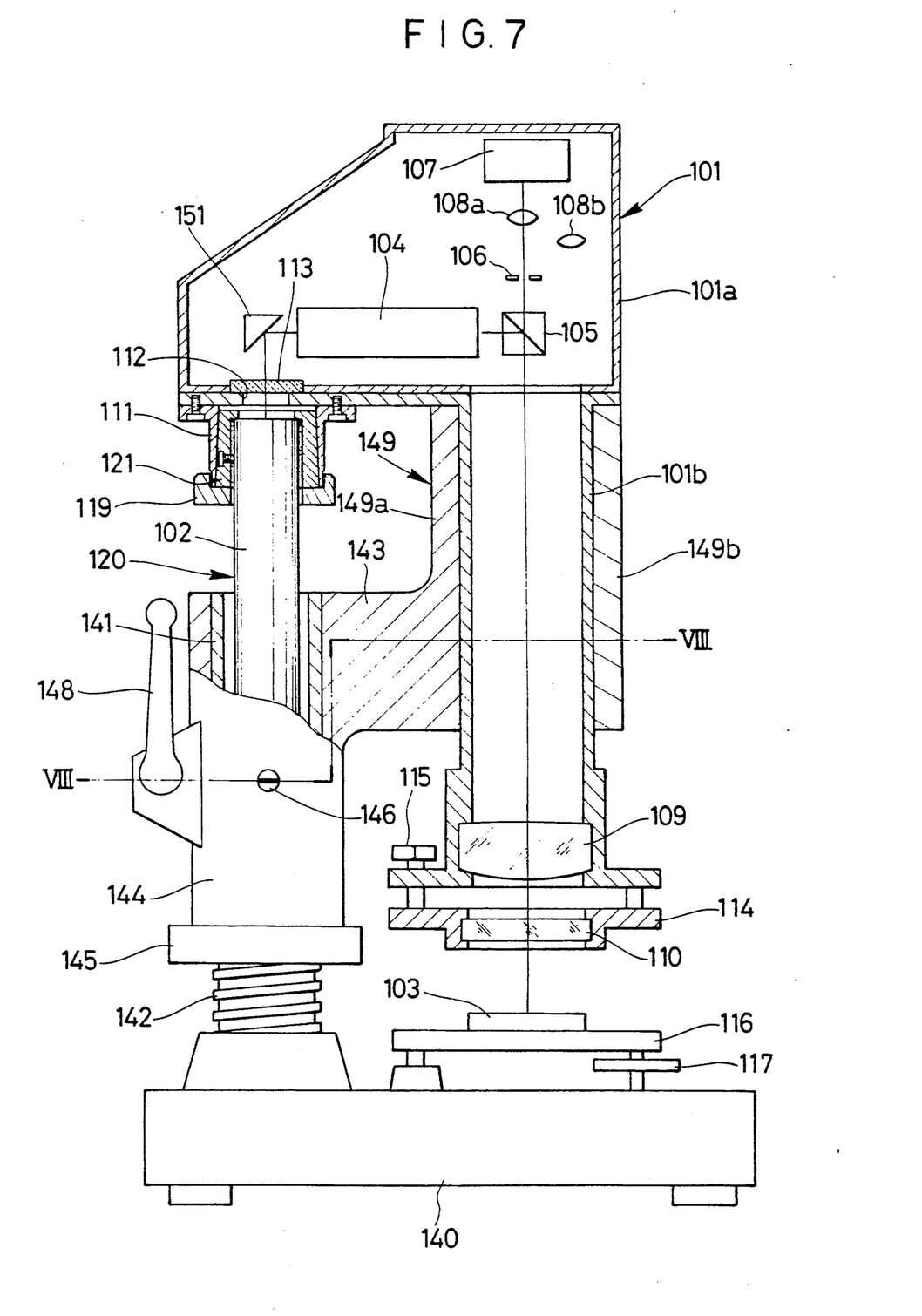
FIG. 7 is a vertical sectional view of the interferometer of FIG. 6.
Figure 8:
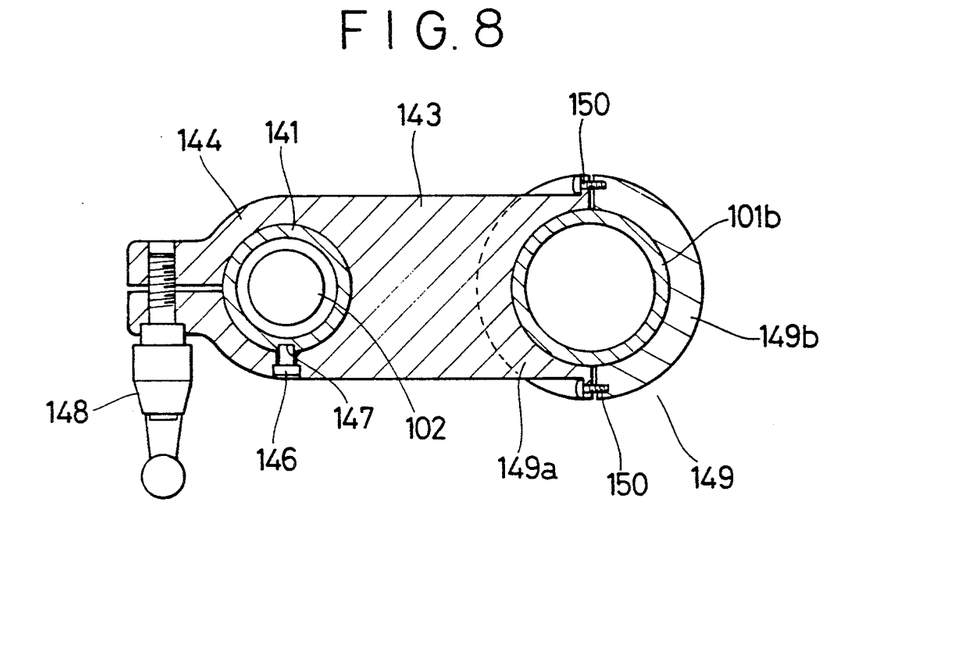
FIG. 8 is a sectional view taken along line VIII—VIII of FIG. 7.

Of these figures, FIG. 6 shows the outer appearance of the laser interferometer and FIG. 7 shows the same in section, wherein indicated at 140 is a base which a specimen support plate 116 for holding a specimen 103 is fixed through adjusting screws 117 to permit adjustment of its angle. Erected on the base 140 is a hollow cylindrical column 141 which is provided with a square screw thread 142 on its circumferential surface.

Fitted on the support column 141 is a cylindrical liftable member 144 which is integrally provided with a support arm 143 to support a housing 101b thereon. The liftable member 144 has the lower end thereof supported on a lock nut 145 which is meshed with the square screw thread 142 on the support column 141. Accordingly, the liftable member 144 is displaceable in the upward or downward direction by turning the lock nut 145. As is clear from FIG. 8, a stopper pin 146 is inserted into the liftable member 144 to block rotation thereof, the stopper pin 146 being engaged with a groove 147 which is formed vertically along the outer surface of the support column 141. As a result, the support arm 143 is held to prevent deflections when the lock nut 145 is turned to adjust the height of the liftable member 144. In this instance, the lift member 144 is constituted by a slit cylindrical body which can be diametrally expanded or contracted by turning a loosening/tightening handle 148 which is provided on the cylindrical body. Accordingly, after loosening the lift member 144 into an expanded state through the handle 148, it can be displaced to a position at a desired level by turning the lock nut 145 and then fixed in that position by contracting its diameter through the handle 148.

In this instance, the housing 101 is constituted by a main body portion 101a, and a lens barrel portion 101b extending downwardly from the lower side of the main body portion 101a. A fore end portion of the afore-mentioned support arm 143 is adapted to serve as a lens barrel holder portion 149 which supports the lens barrel 101b. The lens barrel holder portion 149 is composed of a couple of semi-circular holder members 149a and 149b, of which one holder member 149a is provided integrally with the support arm 143 while the other holder member 149b is connected to the holder member 149a by means of bolts 150. Therefore, when the bolts 150 are tightened, the lens barrel portion 101b is fixed in position, and, when the bolts 150 are loosened, the housing 101 can be turned horizontally about the lens barrel portion 101b.

The main body portion 101a of the housing 101 accommodates therein an optical lens unit 104, a beam splitter 105, a screen 106, a light-spot imaging lens 108a, an interference fringe imaging lens 108b, and an image sensor means 107. Furthermore, a collimater lens 109 is located within the lens barrel portion 101b, and a holder 114 for a reference plate 110 is mounted at the lower end of the lens barrel portion 101b through adjusting screws 115 which permit angular adjustment of the holder 114. Further, an optical filter 113 is fitted in a light guide portion 112 formed in the main body 101a of the housing 101. In this instance, the holder 114 may be unitary fabricated with the lens barrel portion 101b, if desired.

In this regard, there is no difference in particular from the built-in components in the housing 1 of the first embodiment described hereinbefore.

The light guide portion 112 is provided in the bottom wall of the main body 101a, and the laser tube mount 111 is attached to the lower side of the main body 101a in such a manner as to circumvent the light guide portion 112. Therefore, the laser tube unit 120, which has a ring member 121 integrally fitted on a laser tube 102, is located beneath the main body 101a in a vertical direction parallel with the lens barrel portion 101b. A reflecting mirror 151 is located in a position between the optical filter 113 and the optical lens unit 104 to turn the light path by 90°.

As the laser tube 102 is located outside the housing 101 and through the support column 141, this arrangement also permits a reduction in size of the apparatus so as to be of a compact form. Besides, the laser unit 120 which is provided outside the housing 101 has a major part thereof received in the support column 141, so that it is suitably protected against damage which might otherwise be caused, for example, by collision thereagainst of other component parts.

For the purpose of attaching and detaching the laser tube 102 to and from the laser tube mount 111, the box nut 119 is positioned sufficiently above the upper end of the support column 141.

Figure 9:
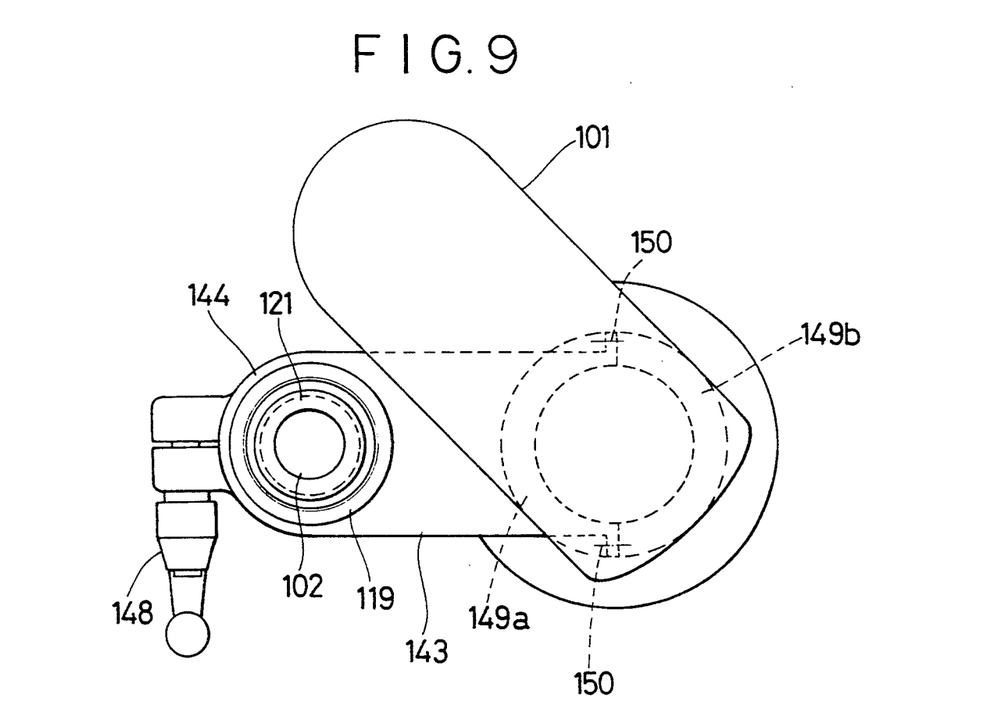
FIG. 9 is a schematic illustration of a laser tube being moved into or out of a predetermined position at the time of replacement.

At the time of replacement of the laser tube, after removing the box nut 119 from the laser tube mount 111, the laser tube 102 which is currently on the laser tube mount 111 is detached therefrom and pushed into the support column 141. At this time, the box nut 119 is simultaneously detached from the laser tube mount 111, and abutted against the upper end of the support arm 143 (or of the support column 141), holding the laser tube 102 in a suspended state within the support column 141. Simultaneously, the bolts 150 on the holder members 149a and 149b are loosened so as to permit the housing 101 to turn horizontally about the lens barrel portion 149 as shown in FIG. 9. As a result, the upper side of the support column 141 is opened to facilitate extraction of the old laser tube unit 120 and replacement of a fresh laser tube unit.

In this state, the housing 101 is returned to the initial position and fixed in that position by tightening the bolts 150. Then, the ring member 121 of the new laser tube unit is inserted into the laser tube mount 111, and the box nut 119 is threaded onto the laser tube mount 111 to complete the replacement of the flesh laser tube.

Figure 10:
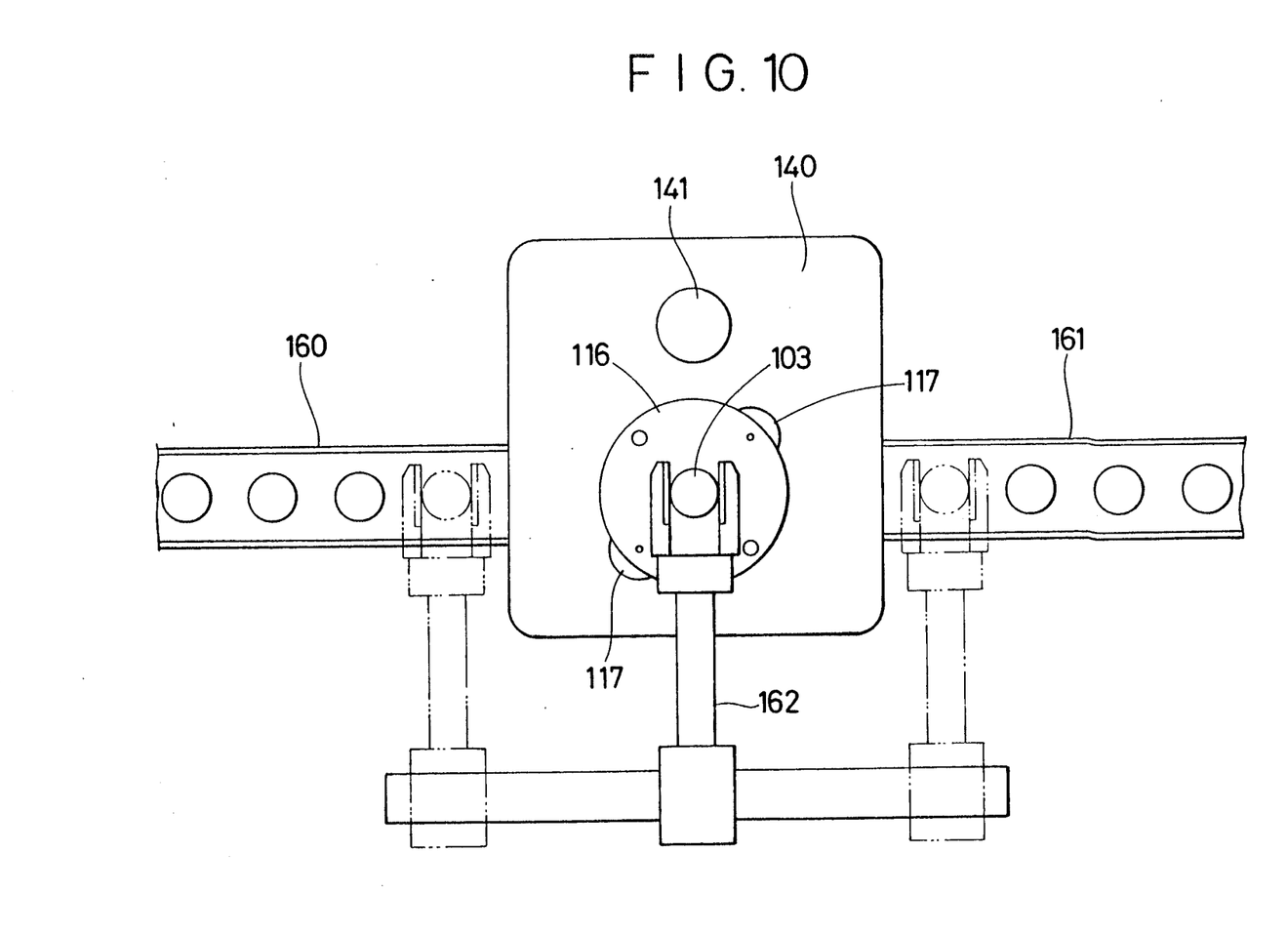
FIG. 10 is a schematic view of a specimen loading and unloading mechanism.

Since only a single support column 141 is erected on the base 140, loading and unloading conveyers 160 and 161 can be provided on the base 140 on the opposite sides of the support column 141 as shown in FIG. 10, continuously delivering specimens 103 by the loading conveyor 160 to place the specimens one after another on the inspection table 116 in cooperation with a pick-and-place means 162 with a chuck means for holding the opposite sides of each specimen, while ejecting inspected specimens by the unloading conveyor one after another upon receipt from the pick-and-place means 162. Thus, the specimens 103 can be automatically loaded and unloaded to and from the interferometer.

Obviously, numerous modification and variations of the present invention are possible in light of the above teachings. It is therefore to be understood that within the scope of the appended claims, the invention may be practiced otherwise than as specifically described herein.

What is claimed is:

1. A laser interferometer for inspecting the surface condition of a specimen by irradiating the specimen on a specimen support means with a laser beam projected thereto through a reference member, and observing the interference fringe produced by interference between the reflected light from a reference surface of said reference plate and reflected light from a surface of the specimen under inspection, which comprises:
    a housing accommodating therein optical laser beam guide means and optical interference fringe imaging means, and provided with a laser beam guide portion in a wall portion thereof;
    a laser tube mount member projected on the outer side of said housing and positioned in such a manner as to circumvent said laser guide portion;
    a laser tube detachably fitted in said laser tube mount member; and
    an optical filter fitted in said light guide portion wherein said laser tube is received in said laser tube mount member as a laser tube unit having a ring member fitted on said laser tube, said ring member serving to align the light path of the laser beam from said laser tube with the optical axis of said optical laser guide means and wherein said ring member is formed to have an inside diameter slightly larger than the outside diameter of said laser tube by a predetermined dimension, and provided with three adjusting screws threaded into a girth portion of said ring member at three equidistant positions around the circumference of said girth portion with a phase shift of 120° from each other, said adjusting screws being driveable toward and away from said laser tube for adjustment of laser tube angle.

2. A laser interferometer as defined in claim 1, wherein said ring member is tapered on the outer periphery thereof complementarily with a tapered wall portion on the inner periphery of said laser tube mount member.

3. A laser interferometer as defined in claim 1, wherein an adhesive is filled in a gap space between said laser tube and ring member.

4. A laser interferometer as defined in claim 1, wherein said interference fringe image sensor is located within said housing.

5. A laser interferometer as defined in claim 1, wherein said interference fringe image sensor is located outside said housing.

6. A laser interferometer for inspecting the surface condition of a specimen by irradiating the specimen on a specimen support means with a laser beam projected thereto through a reference member, and observing the interference fringe produced by interference between the reflected light from a reference surface of said reference plate and reflected light from a surface of the specimen under inspection, which comprises:

a housing accommodating therein optical laser beam guide means and optical interference fringe imaging means, and provided with a laser beam guide portion in a wall portion thereof;

a laser tube mount member projected on the outer side of said housing and positioned in such a manner as to circumvent said laser guide portion;

a laser tube detachably fitted in said laser tube mount member;

a collimater lens received within said housing, said housing including a downwardly extending lens barrel portion for supporting said reference plate thereon through fine position adjustment means, and a base member wherein a support arm is connected to said lens barrel portion and mounted on a support column erected on said base member.

7. A laser interferometer as defined in claim 6, wherein said support arm is connected to said support column adjustably to permit shifts of arm position in the vertical direction relative to said support column.

8. A laser interferometer as defined in claim 6, wherein said laser tube is disposed parallel with said lens barrel portion, and said support member is adapted to receive said laser tube in a socket provided in said support column.

9. A laser interferometer as defined in claim 6, wherein said housing is rotatable horizontally about a joint portion of said lens barrel portion to said support arm.

10. A laser interferometer as defined in claim 6, wherein said reference member is formed by a reference plate.

11. A laser interferometer as defined in claim 6, wherein said reference member is formed by a reference lens.

* * * * *